United States Patent [19]
Wilda et al.

[11] Patent Number: 5,762,100
[45] Date of Patent: Jun. 9, 1998

[54] HEAD FOR COPLANAR METER BODY TRANSMITTER

[76] Inventors: Douglas W. Wilda, 2100 Grant Mews, Ambler, Pa. 19002; Charles E. Lane, III, 766 Moredon Rd., Meadowbrook, Pa. 19046; James V. Davidson, 336 E. Casals Pl., Ambler, Pa. 19002

[21] Appl. No.: 546,850

[22] Filed: Oct. 23, 1995

[51] Int. Cl.$^6$ .................................................. F16L 3/00
[52] U.S. Cl. ........................ 137/341; 137/343; 137/597; 73/201
[58] Field of Search ................................ 137/597, 594, 137/334, 341, 343; 73/201

[56] References Cited

U.S. PATENT DOCUMENTS

| | | | |
|---|---|---|---|
| 3,450,157 | 6/1969 | Hewson | 137/595 |
| 4,193,420 | 3/1980 | Hewson . | |
| 4,582,089 | 4/1986 | Nimberger | 137/884 |
| 4,711,268 | 12/1987 | Coleman | 137/597 |
| 4,738,276 | 4/1988 | Adams | 137/343 |
| 4,879,912 | 11/1989 | Suckow | 137/597 |
| 4,977,917 | 12/1990 | Adams . | |
| 5,209,258 | 5/1993 | Sharp et al. | 137/557 |

FOREIGN PATENT DOCUMENTS

| | | |
|---|---|---|
| 9606338 | 2/1996 | European Pat. Off. . |
| 9618091 | 6/1996 | European Pat. Off. . |
| 2086535 | 5/1982 | United Kingdom . |

*Primary Examiner*—A. Michael Chambers
*Attorney, Agent, or Firm*—Arthur A. Sapelli; Anthony M. Iologos

[57] ABSTRACT

A manifold which mounts a transmitter to a pipeline comprises a body of rectangular-like shape. The body has a first surface and a second surface at right angles to the first surface. The second surface of the body includes a first and second input port, and the first surface of the body includes corresponding first and second output ports. The body also includes a first and second channel internal to the body such that fluid is conducted between the first input port and the first output port, and fluid is conducted between the second input port and the second output port. The body further includes an internal crossover channel between the first channel and the second channel. A third channel is provided internal to the body for permitting steam to flow therein, thereby providing heat to the manifold. A first and second valve is included for controlling the conducting of fluid in the first channel and the second channel, respectively. A third valve is included which controls the flow of fluid in the internal crossover channel.

6 Claims, 4 Drawing Sheets

HEAD FOR COPLANAR METER BODY TRANSMITTER

RELATED APPLICATIONS

The present application is related to U.S. patent application Ser. No. 08/546,849, entitled "Integrated Manifold for Coplanar Pressure Transmitter" by D. Wilda et al, filed Oct. 23, 1995, and assigned to Honeywell Inc., the assignee of the present application.

BACKGROUND OF THE INVENTION

This present invention relates to a pressure transmitter, and more particularly, to a structure of the pressure transmitter including the mounting elements for connecting the pressure transmitter to a pipeline.

A typical pressure transmitter has two heads (differential pressure model) which are bolted together to provide a pressure tight enclosure around the meter body. These heads are then attached to flange adapters (two pieces commonly known as footballs due to their distinctive shape). These parts are supplied to allow the transmitter to be readily disconnected from the piping. The manifold holds three valves for isolation of the transmitter and the process and for calibration of the transmitter in place. These components have traditionally been supplied by different vendors. Each transmitter process head often contains a vent/drain valve to allow trapped gases to be vented from a liquid line, (alternatively condensed liquids from a normally gas-filled line). This overall assembly has a number of potential leak sources and per recent EPA regulations must be monitored periodically and shown that they are not emitting toxic chemicals. Further, when fluids in a pipeline are being measured, many of these fluids are materials which are solids (or effectively solids) at ambient temperatures. It is desired to heat the fluid and keep the fluid hot in order to get the fluid to flow properly. The fluid is kept hot up to the transmitter through the use of heat tracing, either electric or with the use of steam, to keep the temperature above the melting point of the fluid, a technique well known to those skilled in the art. This technique includes the use of steam lines placed in proximity with the process piping and the transmitter assembly, including the 3-valve manifold with insulation wrapped around the entire configuration.

The present invention provides an integrated manifold. The combination of the integrated manifold of the present invention, which is less expensive to build because it eliminates several parts, such as two footballs, eight bolts, one vent/drain valve and one process head, also has many fewer potential leak points. This provides a savings in not needing to check for toxic chemical emissions as frequently. Further, there is included a channel, having an input and output port, for permitting steam to flow internally to the integrated manifold. Because the integrated manifold is a closely coupled part of the transmitter assembly, the additional steam channel of the present invention, which provides a path for the steam through the integrated manifold, and because the entire transmitter assembly is all tightly coupled thermally, the fluid temperature is maintained above the melting point. The present invention thus provides a very simple and effective way of performing the steam tracing function.

SUMMARY OF THE INVENTION

Thus, there is provided by the present invention an integrated manifold for a coplanar transmitter. A manifold mounts a transmitter to a pipeline, the pipeline having fluid flowing therein, and the pipeline further includes a first and second process pipe to couple fluid to the transmitter. The manifold comprises a body of rectangular-like shape. The body has a height, length and width, having a first surface formed by the plane of the width and length and having a second surface at right angles to the first surface formed by the plane of the length and height. The second surface of the body includes a first and second input port, and the first surface of the body includes corresponding first and second output ports. The body also includes a first and second channel internal to the body such that fluid from the first process pipe is conducted from the first input port to the first output port, and fluid from the second process pipe is conducted from the second input port to the second output port. The body further includes an internal crossover channel between the first channel and the second channel. The body also includes a third channel internal to the body for permitting steam to flow therein, thereby providing heat to the manifold. A first and second valve is included, the first valve controlling the flow of fluid in the first channel and the second valve controlling the flow of fluid in the second channel. The first and second valve are placed between the internal crossover channel and the first and second output port respectively. A third valve is included which controls the flow of fluid in the internal crossover channel.

Accordingly, it is an object of the present invention to provide an integrated manifold.

It is another object of the present invention to provide an integrated manifold having reduced potential leak points.

It is still another object of the present invention to provide an integrated manifold having reduced potential leak points and including an internal steam channel for providing heat to the integrated manifold.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 4, which comprises

DETAILED DESCRIPTION

Figure 1:
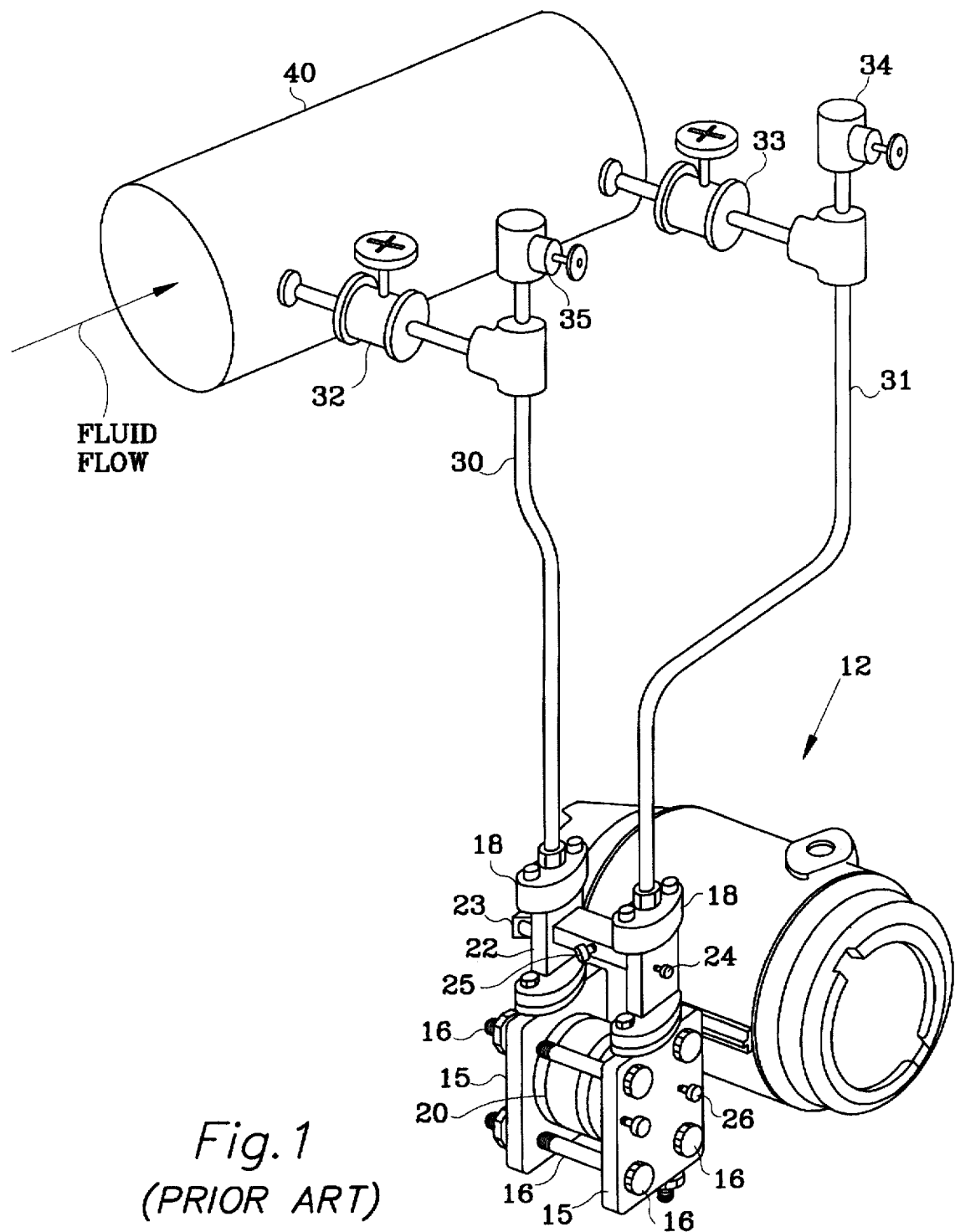
FIG. 1 shows a diagram of a transmitter connected to a pipeline according to the prior art.

Referring to FIG. 1, there is shown a transmitter connected to a pipeline according to the prior art, including the mounting flanges and valves. A typical pressure transmitter of the prior art 12 has two heads 15 (differential pressure model) which are bolted together via bolts 16 to provide a pressure tight enclosure around a meter body 20. These heads are then attached to the manifold 22. The manifold 22 holds three valves, 23, 24, 25, for isolation of the transmitter 12 and the process and for calibration of the transmitter 12 in place. These components have traditionally been supplied by different vendors. Each transmitter process head 15 often contains a vent/drain valve 26 to allow trapped gasses to be vented from a liquid line, and alternatively, condensed liquids from a normally gas-filled line. Process lines 30, 31, include a second valve 32, 33, in each process line respectively. The process lines 30, 31, connect to a pipeline 40 having a fluid flow of a process being carried therein. Vent valves 34, 35 can be included.

Figure 2:
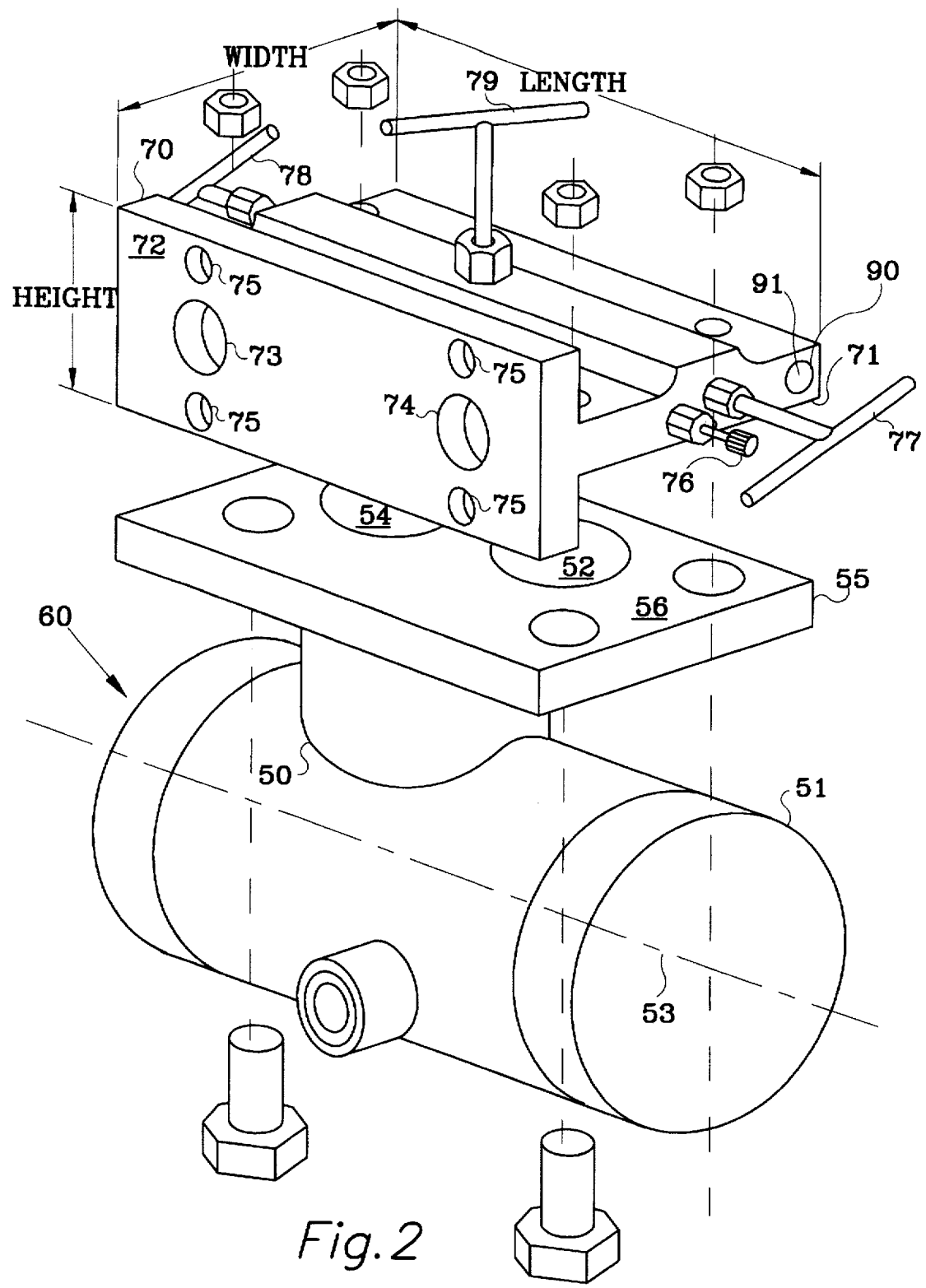
FIG. 2 shows an exploded isometric view of a transmitter including an integrated manifold of the preferred embodiment of the present invention.

Referring to FIG. 2, there is shown an exploded isometric view of a transmitter, including a meter body 50 and a header 55, and an integrated manifold 70 of the preferred embodiment of the present invention. The preferred embodiment utilizes a coplanar-type transmitter body of the type described in U.S. Pat. No. 4,841,777, and is incorporated by reference herein to the extent necessary for an understanding of the present invention. The transmitter 60 includes an electronics housing 51 and the meter body 50, the meter body 50 being coplanar where both pressure ports are in the same plane, and wherein the meter body 50 is attached to the header 55. The process fluid input ports (or conduits) 52, 54 are provided through the header 55 thereby enabling a first and second input fluid to be applied to respective diaphragms of the meter body 50. (Refer to the aforementioned patent for a more detailed description of the meter body 50).

An integrated manifold 70 of the preferred embodiment of the present invention has a first surface 71 which is bolted to a first surface 56 of the header 55. The integrated manifold 70 has a second surface 72 which is at right angles to the first surface 71. The second surface 72 of the integrated manifold 70 includes input ports 73, 74 for connection to the process lines (not shown) compatible with the standard pattern spacing bolting thereto. The second surface 72 of integrated manifold 70 includes the holes 75 necessary for bolting the integrated manifold 70 to the process lines, the pattern spacing of the holes 75 and the input ports 73, 74 being compatible with industry standards, well known to those skilled in the art.

The input port 74 of the integrated manifold 70 has an output port (not shown) which mates (i.e., is opposite) with the input port 52 of header 55, and input port 73 of the integrated manifold 70 couples via an internal channel to an output port (not shown) to mate (i.e., is opposite) with the input port 54 of header 55. The integrated manifold 70 also includes a first and second valve 77, 78 in line with the input ports 74, 73 respectively, and a third valve 79 which provides for internally connecting first and second port 74, 73. A vent/drain valve 76 is also provided. Input port 90 is provided for supplying steam through a steam channel 91 for providing heat to the integrated manifold 70.

Figure 3:
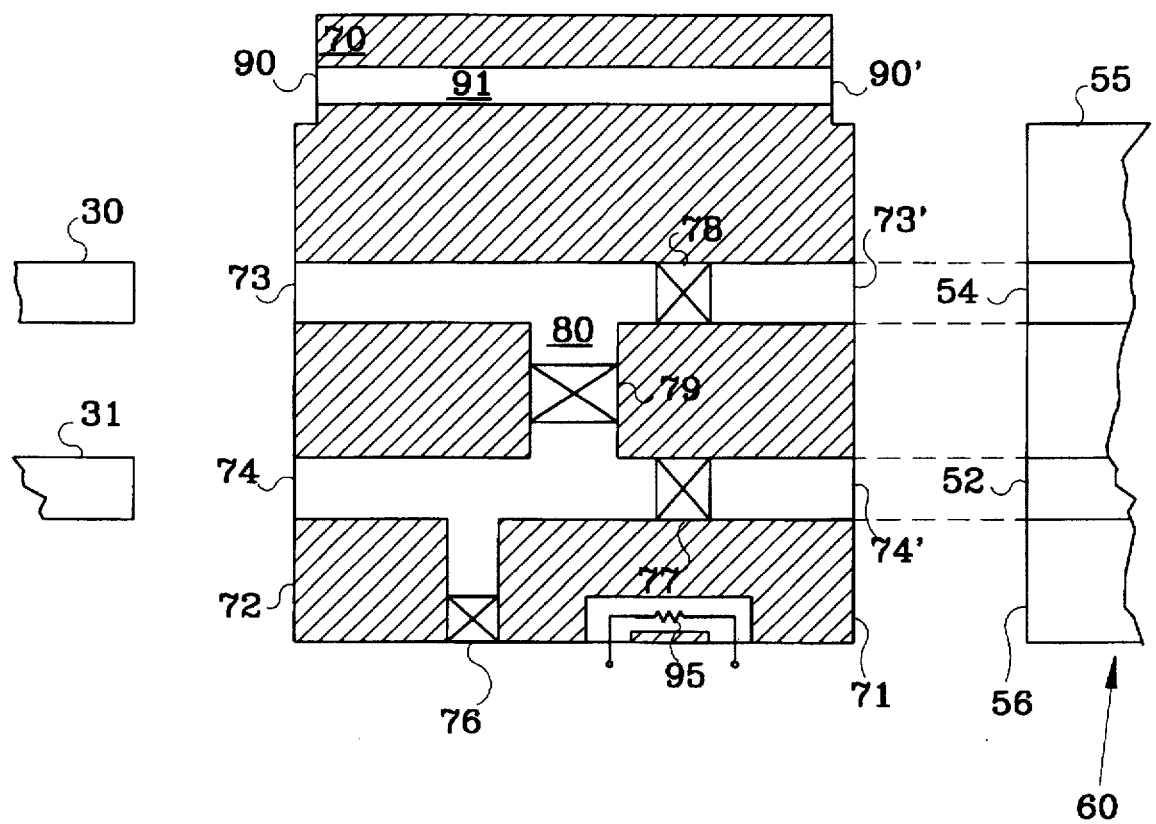
FIG. 3 shows a schematic view of the porting arrangement of the integrated manifold of the preferred embodiment of the present invention.

Referring to FIG. 3 there is shown a schematic view of the porting and channeling arrangement of the integrated manifold 70 of the preferred embodiment of the present invention. The first port 74 includes a first valve 77 and the second port 73 includes the second valve 78. First and second valve 77, 78 permit isolating the transmitter 60 from the process lines 30, 31. First and second port 74, 73 are connectable to each other internally to the integrated manifold 70 via a channel 80, which includes valve 79. This provides for calibration of the transmitter. A single vent drain valve 76 is also included in the first port 74 for purging gas or liquid from the system. To perform the purging process, valve 77, 78 is closed, valve 79 is opened, and the vent/drain valve 76 is opened. In this way only a single vent drain valve is needed for venting the two input ports. The output ports 73', 74' of the integrated manifold 70 align with the input ports 54, 52 of the header 55, respectively. The bolting pattern of the second surface 72 of the integrated manifold 70 is constrained to the standard pattern spacing, whereas the spacing of the header surface 56 can be varied for optimal design of the diaphragm of the coplanar meter body 50, and then the mating surface 71 of the integrated manifold 70 is matched to the mating surface 56 of the header 55. The steam channel 91 is an internal channel of the integrated manifold 70 for permitting steam to flow within the integrated manifold 70 thereby providing heat. The steam channel 91 includes an input port 90 and an output port 91', generally not on the first and second surface 71, 72 which are the mating surfaces. The heat is conducted from the integrated manifold 70 through the closely coupled transmitter assembly to the fluid.

Figure 4A:
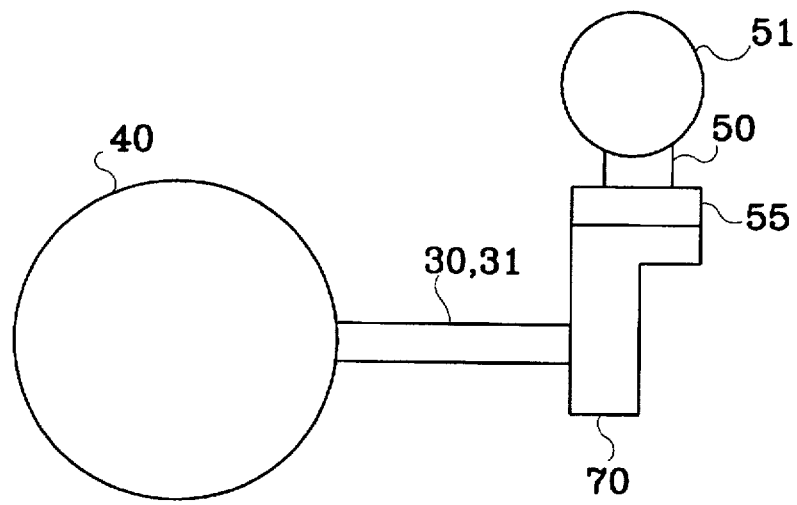
FIGS. 4A–4C, shows the various arrangements for connecting the transmitter to the pipeline.
Figure 4B:
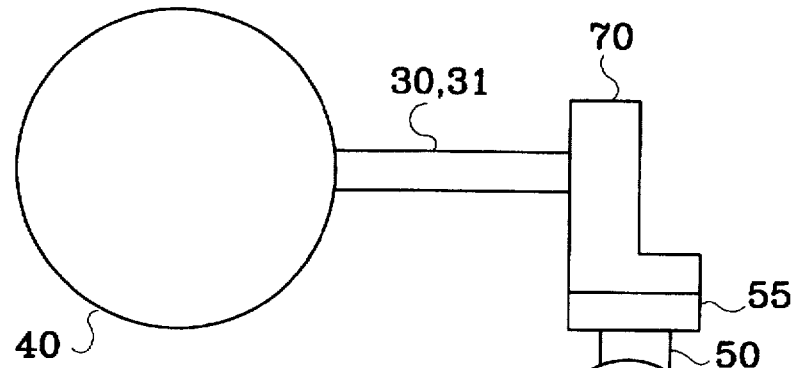
Figure 4C:
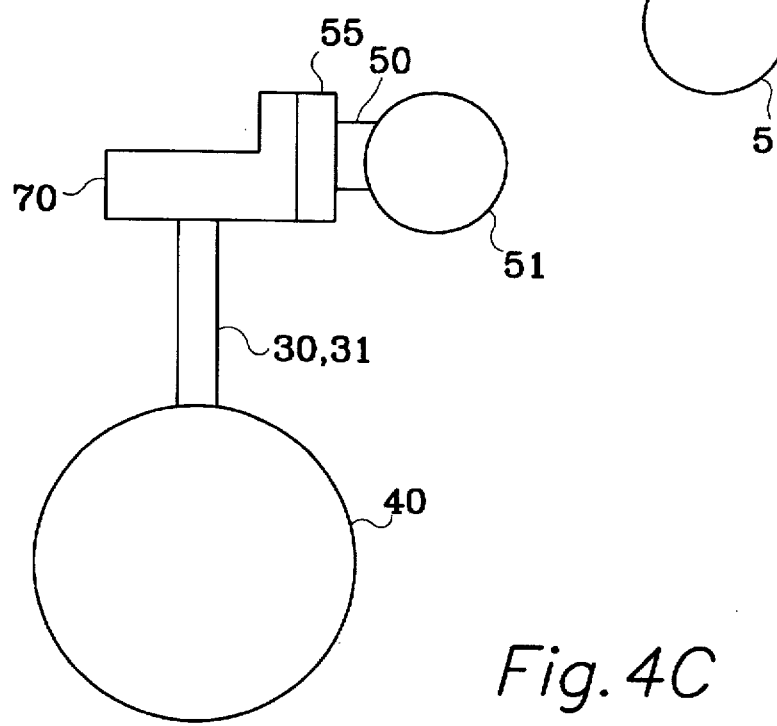

Referring to FIG. 4, which comprises FIG. 4A through 4C, there is shown various arrangements for connecting the transmitter 60, (50, 51, 55) to the pipeline 40 utilizing the integrated manifold 70. In all the configurations, the axis 53 will be parallel to the pipeline, which is the desired orientation for the connection thereto.

Thus it can be seen, by combining the valves with the manifold, a significant reduction of parts is achieved and a significant reduction of potential leak points is also reduced. In addition, various orientations are also possible. Alternatively, a resistive element 95 can be placed internally to the integrated manifold 70 for heating the integrated manifold 70 electrically, the heat from the resistive element 95 being conducted through the closely coupled transmitter assembly to the fluid.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. A manifold for mounting a transmitter to a pipeline, said pipeline having fluid flowing therein, said pipeline further having a first and second process pipe to couple said fluid to said transmitter, said manifold comprising:

a) a body of rectangular-like shape having a height, length and width having a first surface formed by the plane of the width and length and having a second surface at right angles to said first surface formed by the plane of the length and height, and further wherein the second surface includes a first and second input port, and the first surface includes corresponding first and second output ports, the body including a first and second channel internal to the body such that fluid from the first process pipe is conducted from the first input port to the first output port and fluid from the second process pipe is conducted from the second input port to the second output port, the body further including an internal crossover channel between the first channel and the second channel, the body further including a third channel having an input port and an output port, the third channel being internal to the body, for permitting steam to flow in said third channel thereby providing heat to the manifold;

b) a first and second valve, the first valve controlling the flow of fluid in the first channel and the second valve controlling the flow of fluid in the second channel, the first and second valve being placed between the internal crossover channel and the first and second output port, respectively; and c) a third valve located in the internal crossover channel between the first and the second channels for controlling the flow of fluid in the internal crossover channel.

2. A manifold according to claim 1 further comprising:

a) a vent drain valve, the valve controlling the flow of fluid from the first channel to the outside of the body, the vent drain valve being placed in a vent channel, the vent channel being between the first input port and the internal crossover channel, and the outside of the body.

3. A manifold according to claim 2 wherein said transmitter includes a coplanar meterbody.

4. A manifold according to claim 3 wherein said coplanar meterbody further comprises:

a) a header coupled to said meterbody, having a first and second input port, the first surface of the manifold mounting on the header, such that the first and second output ports of the manifold are opposite the first and second input ports of said header.

5. A manifold according to claim 4, wherein said second surface of said manifold mounts to said first and second process pipe in accordance with a predefined pattern spacing and a predefined mounting mechanism, such that the first and second input ports of said manifold and corresponding mounting mechanism of the manifold correspond to the predefined pattern spacing.

6. A manifold for mounting a transmitter to a pipeline, said pipeline having fluid flowing therein, said pipeline further having a first and second process pipe to couple said fluid to said transmitter, said manifold comprising:

a) a body of rectangular-like shape having a height, length and width having a first surface formed by the plane of the width and length and having a second surface at right angles to said first surface formed by the plane of the length and height, and further wherein the second surface includes a first and second input port, and the first surface includes corresponding first and second output ports, the body including a first and second channel internal to the body such that fluid from the first process pipe is conducted from the first input port to the first output port and fluid from the second process pipe is conducted from the second input port to the second output port, the body further including an internal crossover channel between the first channel and the second channel;

b) a first and second valve, the first valve controlling the flow of fluid in the first channel and the second valve controlling the flow of fluid in the second channel, the first and second valve being placed between the internal crossover channel and the first and second output port, respectively;

c) a third valve located in the internal crossover channel between the first and the second channels for controlling the flow of fluid in the internal crossover channel; and d) a resistive element, said resistive element being placed internal to said body, for providing heat to said body such that the heat is conducted through said body to said fluid.

* * * * *